Jan. 12, 1960     C. M. T. NEGREIRA     2,920,586

PLANTING MACHINE

Filed March 30, 1956     2 Sheets-Sheet 1

INVENTOR
C. M. TORRES NEGREIRA
BY Gustave Miller
ATTORNEY

Jan. 12, 1960 C. M. T. NEGREIRA 2,920,586
PLANTING MACHINE
Filed March 30, 1956 2 Sheets-Sheet 2

INVENTOR
C. M. TORRES NEGREIRA
BY
ATTORNEY

United States Patent Office 2,920,586
Patented Jan. 12, 1960

2,920,586

PLANTING MACHINE

Carlos M. Torres Negreira, Montevideo, Uruguay

Application March 30, 1956, Serial No. 575,183

1 Claim. (Cl. 111—8)

This invention relates to an agricultural machine and more particularly to a combined plowing and sowing machine. Heretofore such machines have completely removed the soil from a furrow, depositing the seed in the furrow formed by the removal of the soil.

The instant invention has as a primary object the provision of a machine for admixing the plowed soil with surface detritus such as partially decayed vegation depositing the seeds on this mixture and finally covering the seed.

It is, therefore, a further object of the present invention to provide a machine which effectively renews the crop-producing potentiality of the soil.

Another object of the present invention is to provide a machine which will renew the crop-producing potentiality of the soil at a minimum of expense.

Other objects of this invention are to provide an improved machine, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which.

Figure 1:
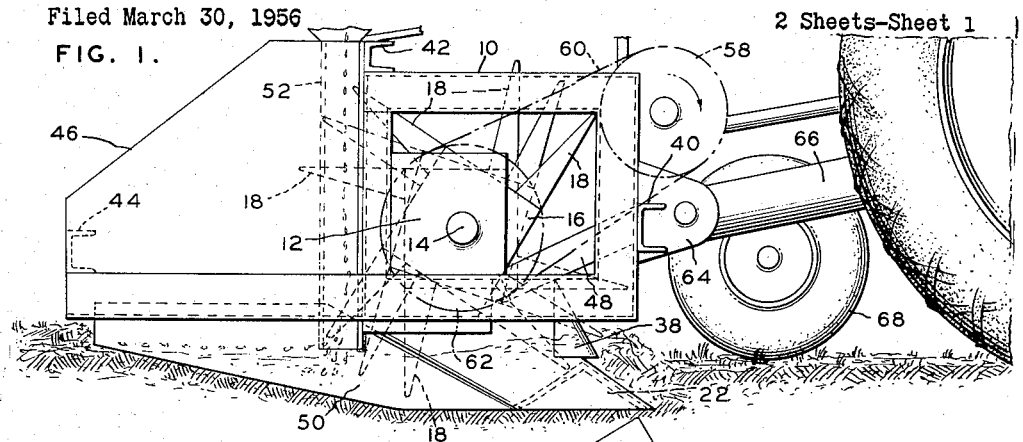
Fig. 1 is a side elevational view of a device embodying the present invention.
Figure 2:
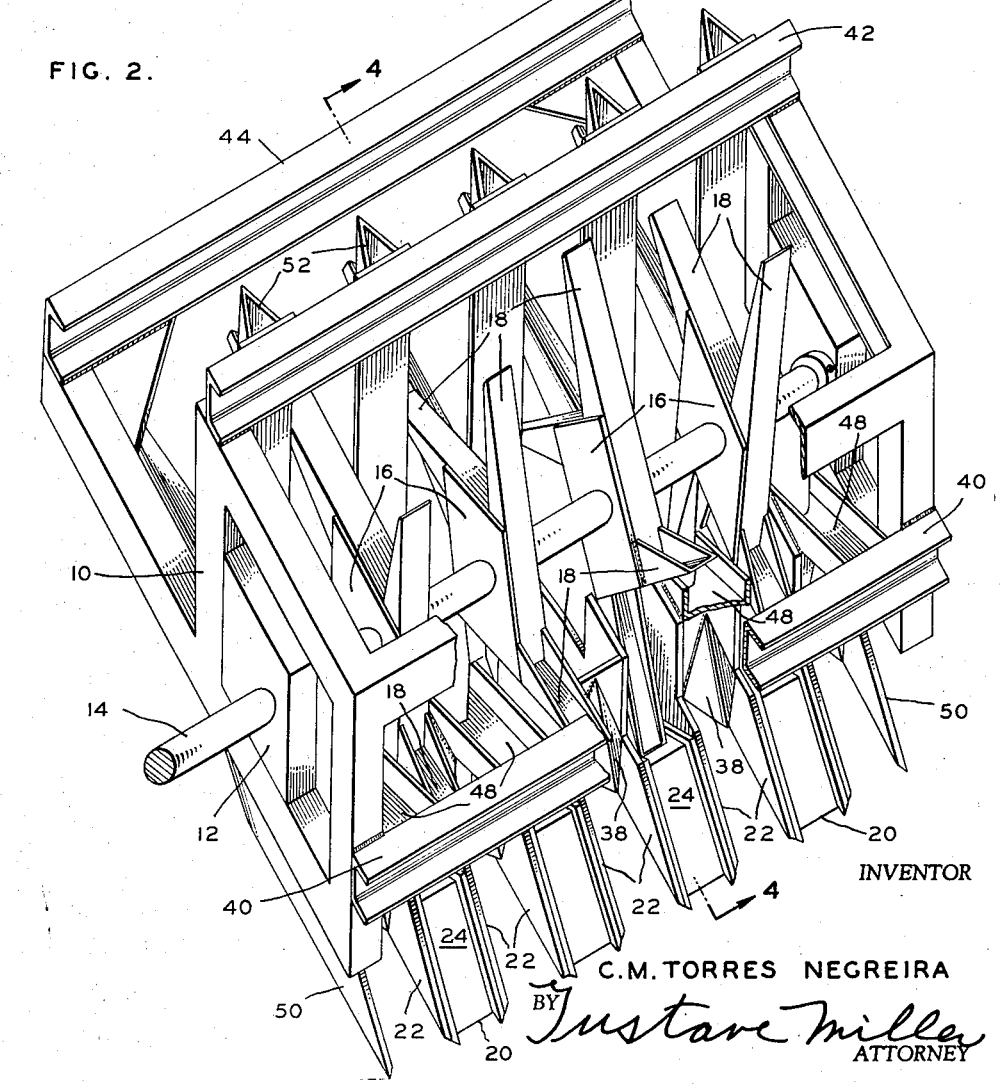
Fig. 2 is a perspective view, with fragmentary portions broken away to better see hidden construction.

This invention, in brief, contemplates the planting of different sections of the soil wherein the organic matter of one section is ploughed into the soil of another section. At the same time, the machine breaks up the soil, mixes the seed into the organic matter, and then embeds both in the earth.

Referring now in greater detail to the drawings wherein similar reference characters refer to similar parts, there is shown a frame 10 having bearings 12 between which is rotatably positioned a shaft 14. Mounted on this shaft in spaced relation to each other are square hubs 16 from each corner of which extends a scoop 18.

Figure 4:
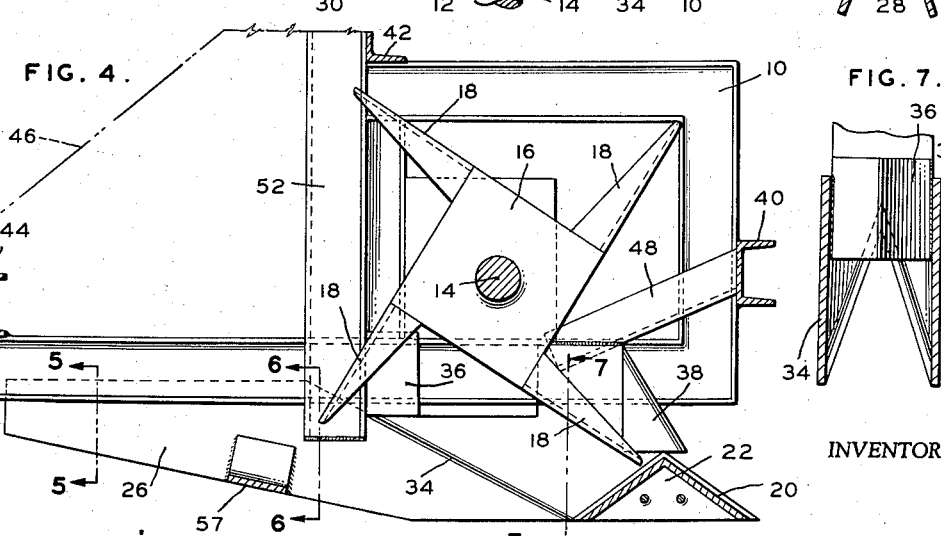
Fig. 4 is a sectional view taken on line 4—4 of Figs. 2 and 3.

Each hub 16, with its associated scoops 18, is positioned between a pair of plough-shares 20, which extend substantially below the rotational path of the scoops 18, as best seen in Fig. 4. Each plough-share 20 comprises a triangular pair of plates 22 connected by a triangular web 24. The edges of the plates 22 are beveled to a knife-like sharpness and extend below the web into positions for biting into and turning up the soil.

Figure 3:
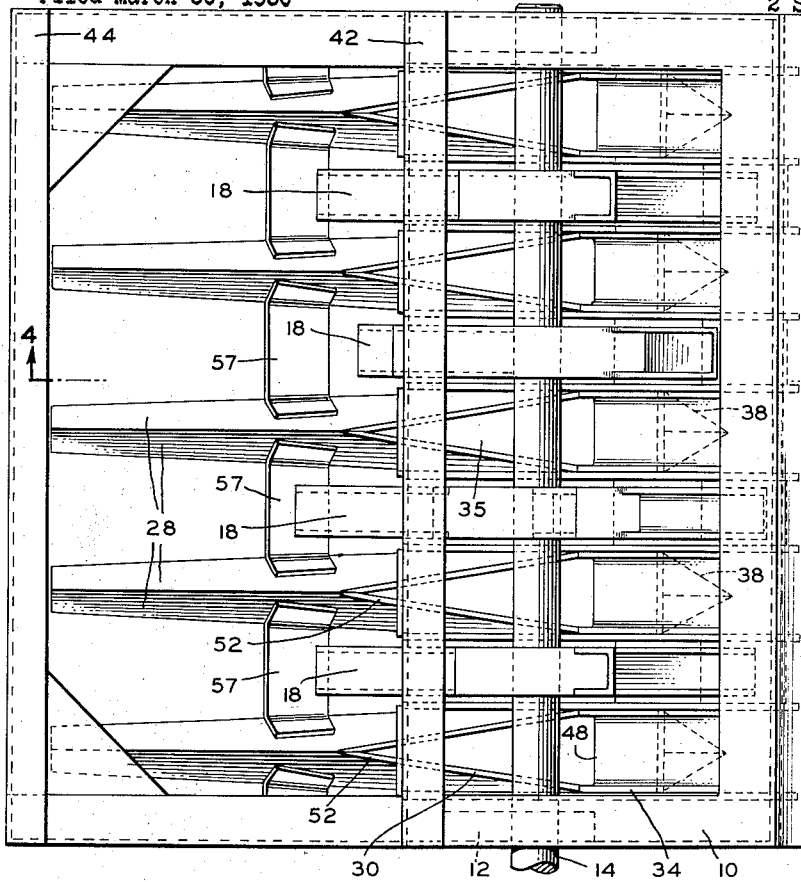
Fig. 3 is a top plan view of the device.
Figure 5:
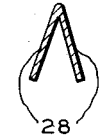
Fig. 5 is a sectional view taken on line 5—5 of Fig. 4.
Figure 6:
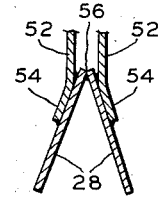
Fig. 6 is a sectional view taken on line 6—6 of Fig. 4.
Figure 7:
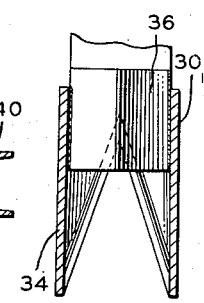
Fig. 7 is a sectional view taken on line 7—7 of Fig. 4.

In line with and to the rear of each plough-share 20 is a guide 26. These guides extend rearwardly well beyond the rotational path of the scoops and each is provided with inclined side walls 28 forming an inverted V-shaped contour of gradually increasing dimensions as it extends longitudinally forward, as best shown in Figs. 3, 5 and 6. These walls then straighten out to form perpendicular wall portions, as best shown at 30. These portions 30 incline downward, as at 34 and laterally outward to form V-shaped openings 35 bounded by wall portions 30, and within each of these V-shaped openings 35 is provided a discharge guide member 36, as best seen in Figs. 4 and 7. Above and to the side of each plough-share is provided a triangular, lateral guide member with inclined side walls, this lateral guide member being shown at 38.

A plurality of angle-bar brace members are provided for the frame, these brace members being shown at 40, 42 and 44. A cover guard 46 is supported between anglebars 42 and 44 while angle-bar 40 supports a series of chutes 48, each of which extends over a guide member 38.

At each side of the frame, depending therefrom into lateral alignment with the plough-shares 20 and guides 26, is a plough-share blade 50.

A boot 52 is mounted above each guide 26 and is provided with flanges 54 on the bottom end thereof. These flanges are welded or otherwise secured to the walls 28 of the guide 26, as best shown in Fig. 6. At this area of the guide 26, it begins to open at the apex, as indicated at 56 in Fig. 6, so that grain or seed, falling down the chute, passes through this opening into the ground. The guide 36 helps guide this grain or seed at this time and also serves as a guide for soil removed by the plow. The boots 52, themselves, are supported on channel bar 42. Guards 57 are provided at the rear of the path of rotation of the scoops and connect the adjacent guides 26 to each other.

The shaft 14 is driven by the motor of the vehicle drawing the device by way of a pulley 58, belt 60 and pulley 62 mounted on the shaft. The pulley 58 is connected to the vehicle motor by any desired means.

A yoke 64 is provided on the frame for connecting it to the vehicle by means of shaft 66. The ordinary type of ground wheel is provided at 68.

In operation, as the machine is dragged over the earth, the plough-shares cut furrows and turn up the soil. This turned-up soil, on either side of each furrow, is churned up and spread by the scoops 18 while, at the same time, organic material falls into this soil from chutes 48.

As the machine is pulled ahead, grain and seed falls through the openings in the guides and is intermixed with the soil. As the machine continues to move forward, guides 26 act to smooth the soil out.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

An earth working apparatus for use with seeding and fertilizing means comprising a frame, a plurality of plough shares each comprising pairs of spaced apart flat faced triangular plough blades carried by said frame, disposed in a vertical plane, a transverse web extending between each said pair of blades and connected thereto adjacent their upper edges, each blade having a sharpened side edge providing plough points extending forwardly of said blades, each said transverse web raising the soil between the connected blades, a plurality of wedge shaped guides, each supported by said frame in transverse line above and between adjacent plough shares diverting the soil rearwardly of the plough shares, a transverse axle shaft rotatably journaled in said frame, hubs secured on said shaft, each hub being located longitudinally behind each plough share, a plurality of earth working scoops extending outwardly from each hub of a length to agitate the earth raised by the shares and diverted by the guides, said scoops having flat bottoms and side walls diverging from a junction with said bottoms toward said hubs to form reinforcing triangles, means secured to the frame for depositing seeds in the furrows formed by the plow shares, and rearwardly tapering earth guiding and compressing elements to the rear of each seed depositing means to press the seed into the soil.

References Cited in the file of this patent

UNITED STATES PATENTS

| | | |
|---|---|---|
| 219,115 | Sackett | Sept. 2, 1879 |
| 324,208 | Alexander | Aug. 11, 1885 |
| 455,830 | Harris | July 14, 1891 |
| 470,379 | Higdem et al. | Mar. 8, 1892 |
| 902,075 | Hamilton | Oct. 27, 1908 |
| 1,292,391 | Dougherty | Jan. 21, 1919 |
| 1,880,113 | Smith | Sept. 27, 1932 |
| 2,090,290 | Gardner | Aug. 17, 1937 |
| 2,190,325 | Bemis et al. | Feb. 13, 1940 |
| 2,539,136 | Hite | Jan. 23, 1951 |
| 2,675,748 | Patterson | Apr. 20, 1954 |